US011542393B2

(12) United States Patent
Van Aert et al.

(10) Patent No.: US 11,542,393 B2
(45) Date of Patent: Jan. 3, 2023

(54) RADIATION CURABLE POLYURETHANE RESIN FOR INK JET INK

(71) Applicant: AGFA NV, Mortsel (BE)

(72) Inventors: Hubertus Van Aert, Mortsel (BE); Ellen Bertels, Mortsel (BE); Johan Loccufier, Mortsel (BE); Sara Matheussen, Mortsel (BE)

(73) Assignee: AGFA NV, Mortsel (BE)

( * ) Notice: Subject to any disclaimer, the term of this patent is extended or adjusted under 35 U.S.C. 154(b) by 284 days.

(21) Appl. No.: 16/766,308

(22) PCT Filed: Nov. 29, 2018

(86) PCT No.: PCT/EP2018/083008
§ 371 (c)(1),
(2) Date: May 22, 2020

(87) PCT Pub. No.: WO2019/106089
PCT Pub. Date: Jun. 6, 2019

(65) Prior Publication Data
US 2020/0369880 A1 Nov. 26, 2020

(30) Foreign Application Priority Data
Dec. 1, 2017 (EP) .................................. 17204844

(51) Int. Cl.
| | |
|---|---|
| *C08F 2/46* | (2006.01) |
| *C08F 2/50* | (2006.01) |
| *C08G 61/04* | (2006.01) |
| *C08L 75/06* | (2006.01) |
| *C08G 18/12* | (2006.01) |
| *C08G 18/32* | (2006.01) |
| *C08G 18/40* | (2006.01) |
| *C08G 18/42* | (2006.01) |
| *C08G 18/48* | (2006.01) |
| *C08G 18/65* | (2006.01) |
| *C08G 18/66* | (2006.01) |
| *C09D 11/101* | (2014.01) |
| *C09D 11/102* | (2014.01) |
| *C09D 11/322* | (2014.01) |
| *C09D 11/38* | (2014.01) |
| *C09D 11/54* | (2014.01) |

(52) U.S. Cl.
CPC .............. *C08L 75/06* (2013.01); *C08G 18/12* (2013.01); *C08G 18/3221* (2013.01); *C08G 18/4018* (2013.01); *C08G 18/4211* (2013.01); *C08G 18/4833* (2013.01); *C08G 18/6541* (2013.01); *C08G 18/6607* (2013.01); *C08G 18/6625* (2013.01); *C09D 11/101* (2013.01); *C09D 11/102* (2013.01); *C09D 11/322* (2013.01); *C09D 11/38* (2013.01); *C09D 11/54* (2013.01)

(58) Field of Classification Search
CPC ....... C08L 75/06; C09D 11/322; C09D 11/38; C09D 11/102; C09D 11/101; C09D 11/54; C08G 18/12; C08G 18/0823; C08G 18/6511; C08G 18/755; C08G 18/4833; C08G 18/6607; C08G 18/6705; C08G 18/4211; C08G 18/6625; C08G 18/3206; C08G 18/4862; C08G 18/4018; C08G 18/6541; C08G 18/3221; C08G 18/348; C08G 18/246
USPC .......................................... 522/93, 90, 1; 520/1
See application file for complete search history.

(56) References Cited

U.S. PATENT DOCUMENTS

| | | | |
|---|---|---|---|
| 2011/0104453 A1 | 5/2011 | Shinjo et al. | |
| 2013/0011590 A1* | 1/2013 | Subramanian | C09D 175/04 428/34.7 |
| 2017/0226360 A1* | 8/2017 | Chen | C09D 11/101 |
| 2020/0369879 A1* | 11/2020 | Van Aert | C09D 11/102 |

FOREIGN PATENT DOCUMENTS

| | | | |
|---|---|---|---|
| EP | 1 379 596 | 1/2004 | |
| EP | 2 166 046 A1 | 3/2010 | |
| EP | 2 960 306 A1 | 12/2015 | |
| WO | 2013/034880 A2 | 3/2013 | |
| WO | WO-2016068983 A1 * | 5/2016 | ........... C09D 11/101 |

OTHER PUBLICATIONS

Official Communication issued in International Patent Application No. PCT/EP2018/083008, dated Mar. 28, 2019.
Van Aert et al., "Liquid Set for Ink Jet Recording", U.S. Appl. No. 16/766,306, filed May 22, 2020.
Van Aert et al., "Aqueous Polyurethane Resin Dispersion", U.S. Appl. No. 16/766,307, filed May 22, 2020.
Loccufier et al., "Aqueous Pigment Inkjet Ink", U.S. Appl. No. 16/766,305, filed May 22, 2020.
Van Aert et al., "Aqueous Polyurethane Resin Dispersion", U.S. Appl. No. 16/766,304, filed May 22, 2020.

* cited by examiner

*Primary Examiner* — Jessica Whiteley
(74) *Attorney, Agent, or Firm* — Leydig, Voit & Mayer, Ltd.

(57) ABSTRACT

A radiation curable polyurethane resin includes an ionic group, a polyalkylene oxide in a side chain thereof, and a (meth)acrylate or (meth)acrylamide having a hydroxyl functional group. The polyurethane resin is obtainable by reacting a polyester polyol, a polyether diol, a polyol containing an ionic group, a (meth)acrylate or (meth)acrylamide having a hydroxyl functional group, and a polyisocyanate. The polyester polyol is obtained by reacting a polycarboxylic acid and a polyol. The radiation curable polyurethane resin can be used as binder in an aqueous ink jet ink.

19 Claims, No Drawings

RADIATION CURABLE POLYURETHANE RESIN FOR INK JET INK

CROSS REFERENCE TO RELATED APPLICATIONS

This application is a 371 National Stage Application of PCT/EP2018/083008, filed Nov. 29, 2018. This application claims the benefit of European Application No. 17204844.9, filed Dec. 1, 2017, which is incorporated by reference herein in its entirety.

BACKGROUND OF THE INVENTION

1. Field of the Invention

The present invention relates to a radiation curable polyurethane resin and more specifically to the use of this polyurethane resin as a binder in aqueous radiation curable ink jet inks and treatment liquids for ink jet printing.

2. Description of the Related Art

In recent years, inkjet techniques have been increasingly utilized for industrial applications such as displays, posters, bulletin boards, packaging, textile, etc. . . . . In such applications durability such as light fastness, water resistance, and wear resistance are important requirements of the printed images and pigment based inks therefore have been developed.

Pigmented inks, such as solvent-based inkjet inks using an organic solvent as a vehicle, and ultraviolet curable inkjet inks including a polymerisable monomer as a main component have been used widely in industrial applications.

However, the solvent-based inkjet inks are not environmentally preferable because the solvent is evaporated in the atmosphere. The disadvantage of ultraviolet curable inkjet inks, these so-called '100% solids' UV curable inkjet inks, is that relatively thick layers are obtained compared to aqueous inkjet inks, such as aqueous latex inkjet inks, which generally contain less than 20% of solids. Thin image layers usually have much better flexibility. Another disadvantage of these inks is that due to the limited viscosity of inkjet inks, from all curable components, predominantly, only monomers can be used to make up the curable image layer. Uncured monomers, such as (meth)acrylates may cause severe skin irritation, may migrate through substrates and give unpleasant odours. Curable oligomers and polymers can only be used in a very limited amount due to their too high viscosity.

In view of such background, there have been developed pigments based aqueous inks for inkjet recording capable of being directly used for printing on non-porous substrates and which give less environmental load. These inks are characterized by the presence of a resin, such as a latex, which binds the pigments and prevents rubbing off the images from the substrate. However in most other properties aqueous latex inkjet inks tend to exhibit an inferior performance compared to UV curable inkjet with respect to compatibility with different substrates (so called substrate latitude), physical properties such as adhesion, solvent and water resistance, wear resistance, scratch resistance, etc. Furthermore, the presence of resins in pigment based aqueous inkjet inks decreases the storage stability of the ink in cartridges and in the printing equipment and may cause a decrease in decap time.

Some efforts have been made to improve the performance of aqueous latex inkjet inks by including features of UV curable inkjet inks, such as the incorporation of water-soluble UV curable monomers, e.g. EP2166046A and US2011104453, the use of cross-linkable latexes as in EP 1379596A, and the combination of both as in WO 2013/034880A which discloses a radiation-curable ink comprising: (a) a polyurethane having ethylenically unsaturated groups; (b) a water-soluble triacrylate; (c) a colorant; (d) a liquid medium comprising water and organic solvent; and (e) optionally a photoinitiator; and (f) optionally a surfactant; wherein the weight of component (d) is greater than the combined weight of components (a), (b), (c), (e) and (f). The latter does not show any results on jetting performance. EP2960306A discloses an aqueous inkjet ink comprising latex which have been charged with UV curable monomers. The process of making requires specific properties of monomers such as low water solubility to improve the charging and solubility in ethyl acetate.

US2017/226360 describes a radiation curable polyurethane binder dispersion which is obtainable by reacting a polyether polyol, a hydroxy containing (meth)acrylate, an ionic group containing compound and a diisocyanate.

Therefore, there remains a need for aqueous inkjet inks and treatment liquids containing resins capable of combining improved jetting performance and storage stability with improved physical properties and solvent resistance of the ink jetted image.

SUMMARY OF THE INVENTION

It is an objective of the invention to provide a solution for the above stated problems. The object has been achieved by incorporating a radiation curable polyurethane resin as defined below into aqueous ink jet inks.

According to another aspect, the present invention includes an aqueous radiation curable ink jet ink composition defined below, wherein the radiation curable polyurethane resin is included as a binder.

According to another aspect, the present invention includes a method of printing images by means of the aqueous ink jet ink as defined below. This method is also defined below.

Other features, elements, steps, characteristics and advantages of the present invention will become more apparent from the following detailed description of preferred embodiments of the present invention. Specific embodiments of the invention are also defined in the dependent claims.

DETAILED DESCRIPTION OF THE PREFERRED EMBODIMENTS

A. Radiation Curable Polyurethane Resin

The radiation curable polyurethane resin of the present invention is characterised by the fact that the resin has an ionic group, a polyalkylene oxide in a side chain of the polyester urethane backbone and a (meth)acrylate or (meth)acrylamide having at least one hydroxyl functional group. Both the ionic group and the polyalkylene oxide increase the dispersibility of the resin in water. The (meth)acrylate or (meth)acrylamide components render the polyurethane resin curable via ultraviolet light or some other suitable electromagnetic radiation. The polyester urethane backbone is obtained by reacting a polyester polyol with a polyisocyanate. The polyurethane resin is thus obtained by reacting a polyester polyol, a polyether diol, a polyol containing an ionic group, a (meth)acrylate or (meth)acrylamide and a polyisocyanate.

A.1. Polyester Polyol

The polyester polyol used in the reaction of the invention, is obtained by reacting a polycarboxylic acid and a polyol. The polyester polyol gives the formed polyurethane a higher flexibility (leading to an improved adhesion to porous and non-porous substrates) and an increased water fastness with respect to polyether polyols for example.

The polyester polyol is a resin formed by an esterification reaction or transesterification reaction between at least one polycarboxylic acid component and at least one polyol component. Any known polycarboxylic acid can be used. Examples are: succinic acid, adipic acid, sebacic acid, dodecane dicarboxylic acid and also aromatic polycarboxylic acid. Specific examples of the aromatic polycarboxylic acid include dibasic acids such as phthalic acid, isophthalic acid, terephthalic acid, 2,6-Naphthalenedicarboxylic acid, 1,4-naphthalenedicarboxylic acid, 1,5-naphthalenedicarboxylic acid; tri- or higher-valent polybasic acids such as trimellitic acid and pyromellitic acid; and acid anhydrides thereof, for example, phthalic anhydride, trimellitic anhydride, pyromellitic anhydride; and the like. As the aromatic polycarboxylic acid component, one or more dibasic acids selected from the dibasic acids mentioned above, lower alkyl ester compounds of these acids, and acid anhydrides can be used. If necessary, a monobasic acid such as benzoic acid, crotonic acid or p-t-butyl benzoic acid; a tri- or higher valent polycarboxylic acid such as trimellitic anhydride, methylcyclohexene tricarboxylic acid or pyromellitic anhydride; or the like can be further used in combination with the polycarboxylic acid component. It is preferred that the polyester is prepared using dicarboxylic acids which give linear polymer chains, in particular 1,4-tereptalic acid copolymers give a better performance regarding colloidal stability in aqueous medium, than phthalic acid anhydride copolymers. Besides terephthalic acids, one could use also other para- or linear substituted polycarboxylic acids to obtain the desired properties such as 2,6-naphthalenedicarboxylic acid or 1,5-naphthalenedicarboxylic acid.

The preferred carboxylic acid is an aromatic dicarboxylic acid such as terephthalic acid and isophthalic acid. The content of aromatic acids within the resin is equal to or higher than 30 mol % and preferably equal to or higher than 50 mol % with respect to the total amount of dicarboxylic acids or anhydrides. Ink jet inks comprising polyurethane resins obtained by reaction of polyesters polyols containing aromatic polycarboxylic acids do show an improved colloidal stability and lead to images with an improved solvent resistance and an improved dry and wet scratch resistance compared to aliphatic dicarboxylic acids. The good results obtained with terephthalic acids and isophthalic acids has probably to do with obtaining a certain amount of crystallinity of the polyurethane resin or providing linear amorphous chains which contribute more to the desired physical properties such as scratch resistance and solvent resistance. Introducing phthalic acid anhydride or isophthalic acid in terephthalic acid based polyesters reduces the crystallinity or chain end-to-end distance and improves the solubility in organic solvents. For terephthalic acid based polyester polyols, it is preferred to use copolymers of terephthalic acid with isophthalic acid or phthalic acid anhydride, more preferably having at least 20 mol % isophthalic acid or phthalic acid anhydride units. For the same reason polyester polyols with only phthalic acid anhydride are less preferred than copolymers where terephthalic acid is incorporated. Polyester polyols based on only phtalic acid anhydride could be very soluble in the polymerization solvent for the PU preparation, but a dried and cured ink layer or coating will have also a lower solvent resistance. Therefore, it is preferred that the aromatic polyester polyol contains between 20 and 80 mol % of terephthalate groups on the basis of the total amount of dicarboxylic acids (or acid anhydrides) in the polyester polyol.

Very suitable polyester polyols containing terephthalic ester units and isophthalic ester units in a ratio of 1:1 mol % are: Dynacoll 7150 supplied by Evonik, Marl, Germany, Vylon 220 from Toyobo, Osaka Japan and Elitel 1401 obtained from Unitika Ltd Dusseldorf Germany.

In order to obtain desired properties of the polyester polyol and using a high content of terephthalic acid, one could use also a mixture of dicarboxylic acids. For example, to reduce the crystallinity one could use a mixture of terephthalic acid and adipic acid. Consequently, one could use also polyester polyols based on a mixture of aromatic polycarboxylic acids and aliphatic dicarboxylic acids such as adipic acid, succinic acid, methylcyclohexene tricarboxylic acid, fumaric acid and sebacic acid or anhydrides such as tetrahydrophthalic acid anhydride, hexahydrophtalic acid anhydride, maleic acid anhydride and succinic acid anhydride.

Polyester polyols with a high content of polycarboxylic acid could have a poor solubility in the preparation solvent (e.g. acetone) for the PU preparation or could have a too high degree of crystallinity in order to get good adhesive properties. In particular, this is the case when only non-branched diols are used for the polyester polyol, such as 1,2-ethylene glycol or 1,4-butane diol. When using aromatic polycaboxylic acid based polyester polyols with more than 35 mol % aromatic polycarboxylic acid, one can preferably use a mixture of different non-branched diols (e.g. a mixture of 1,2-ethylene glycol and 1,4-butane diol) or a mixture of a non-branched diol (e.g. ethylene glycol) with a branched diol (e.g. neopentyl glycol). When using mixtures of different diols for the polyester polyol, one could use high terephthalic acid contents, even up to 100 mol % based of the total polycarboxylic acid content.

Specific examples of the polyol component include diols such as ethylene glycol, diethylene glycol, propylene glycol, dipropylene glycol, 1,4-butanediol, neopentyl glycol, 1,5-pentanediol, 3-methyl-1,5-pentanediol, 1,4-hexanediol and 1,6-hexanediol; and tri- or higher-valent polyols such as glycerin, trimethylolethane, trimethylolpropane and pentaerythritol. For the polyol component, diols as mentioned above are mainly used, and if necessary, tri- or higher-valent polyols such as glycerin, trimethylolethane, trimethylolpropane and pentaerythritol can be further used in combination with the diols. Aromatic diols can also be used to increase the content of aromatic moieties in the polyester polyol. Suitable aromatic diols are: p-xylene glycol, 1,5-naphthalenedimethanol, 1,4-naphthalenedimethanol, 4,4'-bis(hydroxymethyl)biphenyl, bis(hydroxyethyl) terephthalate, bis(2-hydroxypropyl) terephthalate, 1,5-naphthalenedicarboxylic acid 1,5-bis(2-hydroxyethyl) ester, 4,4-bis(hydroxymethyl) diphenylmethane, 2,2-bis(4-β-hydroxyethoxyphenyl)propane (diethoxylated bisphenol A) and bis[p-(2-hydroxyethoxy)phenyl]methane.

Preferably diols with a Mw equal to or less than 400 are used together with the polyester polyol. These polyols can be used singly or as mixture of two or more kinds.

A.2. Polyether Diol

The polyether diol which is used in the present invention can be obtained by addition polymerization of an alkylene oxide with at least one compound having two or more active hydrogen atoms. Examples of this compound include ethylene glycol, diethylene glycol, triethylene glycol, propylene glycol, trimethylene glycol, 1,3-butanediol, 1,4-butanediol, 1,6-hexanediol, glycerol, trimethylolethane and ethylolpropane. Examples of the alkylene oxide include ethylene oxide, propylene oxide, butylene oxide, styrene oxide, epichlorohydrin and tetrahydrofuran. Preferred polyether diols are compounds according to Formula 1.

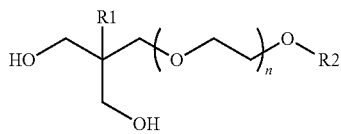

wherein R1 is methyl or ethyl, R2 is H or $C_1$-$C_4$ alkyl and n represents an integer from 5 to 50, more preferably from 10 to 40 and most preferably from 15 to 30.

The polyether diol preferably used in the present invention, is Ymer N120 or Tegomer D 3403, i.e. α-[2,2-bis(hydroxymethyl)butyl]-ω-methoxy-Poly(oxy-1,2-ethanediyl). These diols can be prepared from trimethylol propane oxetane (TMPO). A possible synthesis procedure is described by Fock, J.; Möhring, V., Polyether-1,2- and -1,3-diols as macromonomers for the synthesis of graft copolymers, 1. Synthesis and characterization of the macromonomers. *Die Makromolekulare Chemie* 1990, 191 (12), 3045-3057.

In general also other polyether 1,2- or 1,3-diols can be used. For a good stability the polyether graft needs to be well water soluble in order to give a good steric stabilisation in aqueous medium, such as an aqueous inkjet ink. In the case of Ymer N120 the polyether is only composed of ethylene oxide segments, but this can also be a copolymer of different alkylene oxides. Furthermore in the current macromonomer diol the end group is a methoxy group, this end group can also be other end groups such as a hydrophilic end group (such as carboxylic, sulphate, etc.) in order to have also electro-steric stabilisation. The content of the polyether diol in the polyurethane resin is preferably 30 wt. % or less, but more than 1 wt. % with respect to the polyurethane resin, more preferably the polyether diol content is equal to or less than 15 wt. % and more than 2 wt. % with respect to the polyurethane resin. A content of the polyether diol of less than 30 wt. %, but more than 1 wt. % with respect to the polyurethane resin, has an additional improvement in scratch resistance and solvent resistance of the jetted and cured image with respect to polyether diol content outside this range.

A.3. Polyols Containing an Ionic Group

The ionic group of the polyol can be an anionic group, a cationic group, a cationic group precursor such as a tertiary amino group or both a cationic and anionic group.

Specific examples of anionic groups are selected from the group of carboxylates, sulfonates, sulphate, phosphonates and phosphates. Preferably, the ionic group is a carboxylate anion and/or carboxylic acid. The ratio carboxylate anion/carboxylic acid depends on the pH of the medium in which the polyurethane resin is dispersed. Examples of the carboxyl-containing polyols such as 2,2'-dimethylolpropionic acid, 2,2'-dimethylol butanoic acid, 2,2'-dimethylolbutyric acid, 2,2'-dimethylol valeric acid and their dicarboxylic variants. It is preferred to use among them 2,2-dimethylol propionic acid. The presence of the anionic group in the polyurethane resin provides water solubility or water dispersibility of the resin. The content of the anionic group is equal to or less than 10 (wt.)%, but to improve wet scratch resistance and solvent resistance, the content of the anionic group is preferably equal to or less than 3.0 wt. %, more preferably less than 2.0 wt. %, but more than 0.03 wt. % with respect to the polyurethane resin. A content of ionic group within the range between 0.03 and 3.0 wt. %, has an additional improvement in wet wipe and scratch resistance of the jetted and dried image with respect to ionic group content outside this range.

As a basic compound for neutralizing the aforementioned anionic group, ammonia, triethylamine, morpholine, monoethanolamine and diethylethanolamine, 2-amino-2-methyl-1-propanol, NaOH, KOH and LiOH can be used.

Examples of the cationic group can be selected from protonated amines, protonated nitrogen containing heteroarmoatic compounds, quaternized tertiary amines, N-quaternized heteroaromatic compounds, sulfoniums and phosphoniums, quaternized tertiary amines and N-quaternized heteroaromatic compounds being more preferred.

Preferably, the polyol having a cationic group or a precursor for a cationic group is a diol containing an N-atom, being a tertiary amino group or quaternary N-atom.

Examples of suitable diols having a N-atom in the main chain, for introducing a cationic group are: 2-[(2-Hydroxyethyl)phenylamino]ethanol, CAS Registry Number 120-07-0, 2-[Ethyl(2-hydroxyethyl)amino]ethanol, CAS Registry Number 139-87-7, 2,2'-(Butylimino)diethanol, CAS Registry Number 102-79-4, Diethanol-m-toluidine, CAS Registry Number 91-99-6. Examples of suitable diols having a N-atom in the side chain for introducing a cationic group are: 2-[(Dimethylamino)methyl]-1,3-propanediol, CAS Registry Number 69040-18-2, 2-Methyl-2-dimethylaminomethyl-1,3-propanediol, CAS Registry Number 36254-31-6, 2-Ethyl-2-dimethylaminomethyl-1,3-propanediol, CAS Registry Number 25941-41-7, 2-Diethylaminoethyl-2-methyl-1,3-propanediol, CAS Registry Number 29006-31-3, 2-Diethylaminomethyl-2-ethyl-1,3-propanediol, CAS Registry Number 26102-95-4, 3-[methyl(phenylmethyl)amino]-1,2-propanediol, CAS Registry Number 60278-98-0. In a further preferred embodiment, the polyol having a cationic group is N,N'-dihydroxyethyl-p-toluidin, 2,2'-(methylimino)diethanol) or 3-(Dimethylamino)-1,2-propanediol. Diols having a N-atom in the side chain have the advantage that the obtained radiation curable PU-resins do not need a steric stabilisation by incorporating a polyether polyol.

The tertiary amino diols are precursors of a cationic ionic group as they become cationic after protonation with an acid. Examples of inorganic acids are hydrochloric acid, perchloric acid, sulphuric acid, hydrobromic acid, hydroiodic acid, phosphoric acid, nitric acid, boric acid, etc. Examples of organic acids include: acetic acid, formic acid, propionic acid, citric acid, oxalic acid, ascorbic acid, lactic acid, benzoic acid, toluene sulphonic acid, phenol, salicylic acid, acrylic acid, maleic acid, itaconic acid, stearic acid, glutamic acid, sulfoethyl methacrylate, carboxyethyl acrylate, 2-acrylamido-2-methyl-1-propanesulfonic acid, monoacryloyloxyethyl hexahydrophthalate, methacryloyloxyethyl succinate, acryloyloxyethyl succinate or other organic compounds with an acidic proton such as sulphonamides or thiols. Preferably ecetic acid is used.

For both incorporating a cationic and an anionic group, amphoteric diols can be used. Suitable examples are N,N-bis(2-hydroxyethyl)-N-methyl-3-sulfo-Propanaminium, hydroxide, inner salt, CAS Registry Number 94159-69-0, 2-Oxepanone, homopolymer, ester with N,N-bis(2-hydroxyethyl)-N-methyl-3-sulfo-1-propanaminium inner salt (2:1), CAS Registry Number 1310328-15-4, Poly(oxy-1,2-ethanediyl), α,α'-[[hexadecyl(3-sulfopropyl)iminio]di-2,1-ethanediyl]bis[ω-hydroxy-, inner salt, CAS Registry Number 119400-98-5, Poly(oxy-1,2-ethanediyl), α,α'-[[octadecyl(3-sulfopropyl)iminio]di-2,1-ethanediyl]bis[ω-hydroxy-, inner salt, CAS Registry Number 71787-37-6, Poly[oxy(1-oxo-1,6-hexanediyl)], α,α'-[[methyl(3-sulfopropyl)imino]di-2,1-ethanediyl]bis[ω-hydroxy-, inner salt, CAS Registry Number 1310136-40-3, N-(carboxymethyl)-N,N-bis(2-hydroxyethyl)-1-Butanaminium, inner salt, CAS Registry Number 157465-99-1. In order to get a good in corporation of the amphoteric structural unit in the polyurethane chain, one can use also polymeric diols according to Formula 2, such as MDAPS PP available via Raschig:

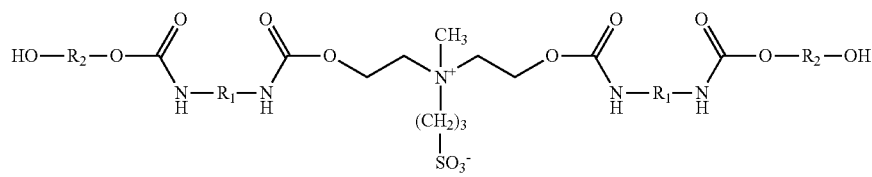

Formula 2

For the preparation of zwitter ionic polyurethanes one can also use a product where the carboxylate is protected by an ester, e.g. 1-Hexanaminium, 6-ethoxy-N,N-bis(2-hydroxyethyl)-N-methyl-6-oxo-, bromide (1:1), CAS Registry Number 1400118-59-3.

A.4. The (Meth)Acrylate or (Meth)Acrylamide Having a Hydroxyl Functional Group.

A further component in the reaction leading to the radiation curable polyurethane resin of the invention is an acrylate or methacrylate having at least one hydroxyl functional group or an acrylamide or methacrylamide having at least one hydroxyl functional group. These components render the polyurethane resin curable via ultraviolet light or some other suitable electromagnetic radiation. More preferably, the (meth)acrylate is incorporated in the polyurethane resin. The (meth)acrylate or (meth)acrylamide having a hydroxyl functional group is preferably present in an amount ranging from greater than 0 wt % to 40 wt %, more preferably from 2 wt. % to 30 wt. % based on the total wt. % of the radiation curable polyurethane.

Some examples of the acrylate or methacrylate with at least two hydroxyl functional groups include those obtained from the reaction of diglycidyl compounds with (meth)acrylic acid. Aliphatic diglycidyl compounds derived from alpha, omega diols having 4 to 12 carbon atoms or from polyoxyalkylenediols (such as polyethylene glycol, polypropylene glycol, or mixtures thereof that contain oxyalkylene group(s)) may be used. Some specific examples include 1,4-butanediol diglycidyl ether, 1,6-hexanediol diglycidyl ether, cyclohexanedimethanol diglycidyl ether, polyethylene glycol diglycidyl ether, and polypropylene glycol diglycidyl ether.

Some commercially available examples include MIRAMER PE-210 (bisphenol A epoxy acrylate) and MIRAMER PE-230 (aliphatic alkyl epoxy acrylate) (both of which are available from Miwon Chemical). In further examples, component (c) includes aromatic diglycidyl compounds derived from bisphenol A and bisphenol F. Specifically, bisphenol A diglycidyl ether (BADGE), bisphenol F diglycidyl ether, and their ethoxylated and/or propoxylated equivalents may be used. Diglycidyl esters may also be used, such as diglycidyl phthalate, N, N-diglycidyl aniline, or N, N-diglycidyl-4-glycidyloxyaniline. Some specific examples include a diacrylate ester of bisphenol A diglycidyl ether (e.g. bisphenol A glycerolate diacrylate) and a dimethacrylate ester of bisphenol A diglycidyl ether (e.g. butylene glycol dimethacrylate).

Suitable examples of acrylates having two hydroxyl groups include Pentaerythritol diacrylate (CAS Registry Number 53417-29-1), Pentaerythritol, dimethacrylate (CAS Registry Number 26846-58-2), 1,4-Butanediol diglycidyl ether diacrylate (CAS Registry Number 52408-42-1) Bisphenol A bis(2-hydroxy-3-methacryloxypropyl) ether (CAS Registry Number 1565-94-2) 2,3-Hydroxypropyl acrylate (CAS Registry Number 10095-20-2), Ethylene glycol diglycidyl ether dimethacrylate (CAS Registry Number 68856-43-9), Diethylene glycol diglycidyl ether diacrylate (CAS Registry Number 55252-47-6), Trimethylolpropane monoacrylate (CAS Registry Number 7024-08-0), Trimethylolethane monomethacrylate (CAS Registry Number 7024-05-7), Trimethylolethane monoacrylate (CAS Registry Number 7024-04-6) 1,6-hexanediylbis[oxy(2-hydroxy-3,1-propanediyl)]bisacrylate, MIRAMER PE-210 (bisphenol A epoxy acrylate), and MIRAMER PE-230 (aliphatic alkyl epoxy acrylate).

Suitable (meth)acrylamides with two hydroxyl functional groups include N-[3-hydroxy-2-(hydroxymethyl)-2-methylpropyl]-2-Propenamide, (CAS Registry Number 1866449-88-8), N-(1,3-Dihydroxypropan-2-yl)acrylamide (CAS Registry Number 1049710-83-9), N-(1,3-Dihydroxypropan-2-yl)methacrylamide (CAS Registry Number 131808-79-2).

Some examples of an acrylate or methacrylate having one hydroxyl functional group include the esterification products of aliphatic and/or aromatic polyols with acrylic acid or methacrylic acid. These products have a residual OH functionality of about 1. Some of these products also have at least two acrylic functionalities.

Examples of the acrylate or methacrylate having one hydroxyl functional group include the partial esterification products of acrylic acid and/or methacrylic acid with tri-, tetra-, penta- or hexahydric polyols or mixtures thereof. These modified or unmodified polyols are partly esterified with acrylic acid, methacrylic acid or mixtures thereof until the desired residual hydroxyl functionality is reached. Suitable examples include acrylic or the methacrylic esters with linear and branched polyols in which the at least one hydroxyl functionality remains free, such as hydroxyalkylacrylates or hydroxyalkylmethacrylates having 1 to 20 carbon atoms in the alkyl group. Some specific examples include hydroxyethylacrylate, hydroxyethylmethacrylate, hydroxybutylacrylate, hydroxybutylmethacrylate, (3-(acryloxy)-2-hydroxypropyl methacrylate, glycerol diacrylate, trimethylolpropane diacrylate, pentaerythritoltriacrylate, ditrimethylolpropane triacrylate, dipentaerythritol pentaacrylate, and (poly)ethoxylated and/or (poly)propoxylated equivalents of glycerol diacrylate, 6-Hydroxyhexyl acrylate (CAS Registry Number 10095-14-4), 3-Hydroxypropyl acrylate (CAS Registry Number 2761-08-2), Dipentaerythritol pentaacrylate (CAS Registry Number 60506-81-2), 1,1,1-Tris(hydroxymethyl)propane diacrylate (CAS Registry Number 37275-47-1), 2-(2-Hydroxyethoxy)ethyl acrylate (CAS Registry Number 13533-05-6), 2-Hydroxy-1,3-dimethacryloxypropane (CAS Registry Number 1830-78-0) and 3-Dimethylamino-2-hydroxypropyl methacrylate (CAS Registry Number 37817-81-5).

Suitable (meth)acrylamides with one hydroxyl functional group include N-(3-Hydroxypropyl)acrylamide (CAS Registry Number 44817-99-4), (2-Hydroxyethyl)acrylamide CAS Registry Number 7646-67-5).

Most preferred acrylates are 4-hydroxybutyl acrylate and 1,4-Butanediol diglycidyl ether diacrylate, the 1,4-Butanediol diglycidyl ether diacrylate even more preferred.

A.5. Polyisocyanates

Specific examples of the organic polyisocyanate compound that is used in the reaction leading to the product of the invention include aliphatic diisocyanates such as lysine diisocyanate, hexamethylene diisocyanate and trimethylhexane diisocyanate; cyclic aliphatic diisocyanates such as hydrogenated xylene diisocyanate, isophorone diisocyanate, methylcyclohexane-2,4 (or 2,6)-diisocyanate, 4,4'-methylenebis(cyclohexyl isocyanate) and 1,3-(isocyanatomethyl) cyclohexane; aromatic diisocyanates such as tolylene diisocyanate, xylene diisocyanate and diphenylmethane diisocyanate; organic polyisocyanates themselves, including tri- or higher-valent polyisocyanates such as lysine triisocyanate; adducts each composed of such an organic polyisocyanate with a polyhydric alcohol, a low molecular weight polyester resin or hydrogen; and cyclised polymers (for example, isocyanurate), biuret type adducts and the like, each formed from various diisocyanate compounds mentioned above.

It is preferable, from the viewpoint of storage stability of the ink composition or treatment liquid composition, that the organic polyisocyanate compound according to the invention include at least one selected from non-yellowing type polyisocyanate compounds such as isophorone diisocyanate, hexamethylene diisocyanate and lysine diisocyanate, and it is more preferable that the organic polyisocyanate compound include at least isophorone diisocyanate.

Furthermore, the organic polyisocyanate compounds can be used singly alone or as mixtures of two or more kinds.

A.6. Reaction Conditions

In regard to the conditions for the reaction between the polyester polyol, the polyether diol, the polyol containing an ionic group, the organic polyisocyanate compound and the (meth)acrylate or (meth)acrylamide having a hydroxyl functional group, those conventionally used reaction conditions can be used without particular limitation.

Besides the polyester polyols also a mixture of different polymeric polyols can be used to adjust the physical properties, adhesion, mechanical performance, ect. Examples are e.g. polycarbonate polyols, polyether polyols, polyacrylate polyols, aliphatic polyester polyols, polyolefin polyols or other polymeric polyols. Examples of polycarbonate polyols are e.g. Oxymer C112, Oxymer M112 (available via Perstorp), Kuraray polyol C-2050, C-2090, C-1090 (available from Kuraray), Converge HMA-1 and Converge HMA-1 (available from Novomer Inc.), Duranol T6002, T6001, T5652, T5651, T5650J, T4672, T4671, T4692 and T4691 (available from Asahi kasei). Additional aliphatic polyester polyols, are e.g. regular (semi)crystalline or amorphous grades, e.g. based on hexane diol adipates (e.g. Dynacoll 7372 from Evonik) but also polyester polyols based on natural products such as polyester polyols made by using dimer acid or dimer diols (e.g. trade name Priplast from Croda), examples are Priplast 3192 and Priplast 1838. The raw material used to prepare certain Priplast grades, i.e. dimer diols with trade name Pripol can also be used as monomer in the PU synthesis to modify the physical properties and adhesive properties.

Preferably the polyester polyol, the polyether diol, the polyol containing an ionic group and the organic polyisocyanate compound are mixed for reacting, using an excess of isocyanate before adding the (meth)acrylate or (math) acrylamide having a hydroxyl functional group. This enables a good conversion of the reaction. Depending on the molecular weight and the copolymer composition, the polyester polyol, may have a poor solubility in the reaction solvent (e.g. acetone). Also the polyol with the ionic group has a poor solubility in acetone. The isocyanato terminated pre-polymer and free IPDI which is available in excess is then further reacted with the (meth)acrylate or (meth)acrylamide having at least two hydroxyl functional groups, using the diol as chain extender or with the (meth)acrylate or (meth)acrylamide having one hydroxyl functional group as a chain terminator to produce a (meth)acrylate terminated or (meth)acrylamide terminated polyurethane.

So in the reaction conditions used a pre-condensation step with NCO/OH-ratio>1 and a chain extension step at NCO/OH-ratio=1.0 can be distinguished. Instead of using a 2-step process, one could use also a one-step or semi-continuous process wherein the polyester polyol, the polyether diol, the polyol containing an ionic group the organic polyisocyanate compound and the (meth)acrylate or (meth)acrylamide having a hydroxyl functional group are mixed for reacting.

Examples of the organic solvent used for the reaction between the polyester polyol and the organic polyisocyanate compound here include ketones such as acetone and methyl ethyl ketone, ethers such as tetrahydrofuran and dioxane, acetates such as ethyl acetate and butyl acetate, nitriles such as acetonitrile, and amides such as dimethyl formamide, N-methylpyrrolidone and N-ethylpyrrolidone. These may be used singly or in combinations of two or more.

Using higher molecular weight polyols than Ymer120N will give more phase separation, providing a better water dispersibility. However for the making of the polyurethane resin, it is more difficult to dissolve these polyols in de organic solvent, e.g. acetone. This can be overcome by using a co-solvent during the polycondensation reaction. A preferred co-solvent is 2-pyrolidon or N-methylpyrrolidone.

The ink composition of the invention contains the polyurethane resin as an essential component. Therefore, the polyurethane resin is preferably dispersed in water to obtain an aqueous dispersion of the polyurethane resin. Every dispersing technology suitable for preparing an aqueous dispersion may be used.

The mass ratio of the polyurethane resin to the colorant that will be described later is preferably equal or less to 5. A ratio higher than 5 results is a decrease of the jetting properties.

B. Ink Jet Ink Composition

The aqueous radiation curable inkjet ink or treatment liquid according to the present invention contains the polyurethane resin as described in § A, water and preferably a water-soluble organic solvent. Additional components are given below. When to be used in an inkjet ink, a wt. % equal to or lower than 20 wt. % of the polyurethane resin of the invention is incorporated in the ink jet ink formulation.

If the treatment liquid according to the invention can be used as a varnish containing the polyurethane resin of the invention to increases gloss and scratch resistance of printed images.

The treatment liquid can also be applied onto the substrate, commonly named as a pre-treatment liquid, by means of a coating technique, a spraying technique and a valve-jetting technique. Preferably, the pre-treatment liquid comprises the radiation curable polyurethane resin with cationic groups. In case these application techniques are used for the pre-treatment liquid, the content of the polyurethane resin in the liquid is equal to or less than 30 wt. %.

B.1. Colorant

The inkjet ink according to the present invention contains preferably a colorant. Preferably the colorant is a pigment. As the pigment, any inorganic pigment or organic pigment can be used. Treatment liquids used a pre-treatment liquids may also contain a pigment, preferably a white pigment, e.g. containing $TiO_2$.

As the inorganic pigment titanium oxide, iron oxide, calcium carbonate, barium sulfate, aluminium hydroxide, Barium Yellow, Cadmium Red, and Chrome Yellow, carbon black can be used. Other suitable inorganic pigments are disclosed in [072-075] from WO2009/053302.

Among them, carbon black (Pigment Black 7) can be preferably used, and examples thereof include carbon blacks available from Cabot Corporation under trademarks Regal, Black Pearls, Elftex, Monarch, Regal, Mogul and Vulcan (for example, Black Pearls 2000, 1400, 1300, 1100, 1000, 900, 880, 800, 700 and 570, Black Pearls L, Elftex 8, Monarch 1400, 1300, 1100, 1000, 900, 880, 800 and 700, Mogul L, Regal 330, 400 and 660, and Vulcan P), and SENSIJET BlackSDP100 (SENSIENT), SENSIJET BlackSDP1000 (SENSIENT) and SENSIJET BlackSDP2000 (SENSIENT).

Examples of the organic pigment include azo pigments (including azo lakes, insoluble azo pigments, condensed azo pigments, and chelate azo pigments), polycyclic pigments (for example, phthalocyanine pigments, perylene pigments, perinone pigments, anthraquinone pigments, quinacridone pigments, dioxazine pigments, indigo pigments, thioindigo pigments, isoindolinone pigments, and quinophthalone pigments), dye chelates (for example, basic dye-type chelates and acidic dye-type chelates), nitro pigments, nitroso pigments, and aniline black. Specific examples include C.I. Pigment Yellow I, 3, 12, 13, 14, 17, 24, 34, 35, 37, 42 (Yellow Iron Oxide), 53, 55, 74, 81, 83, 95, 97, 98, 100, 101, 104, 108, 109, 110, 117, 120, 128, 139, 150, 151, 155, 153, 180, 183, 185 and 213, C.I. Pigment Orange 5, 13, 16, 17, 36, 43 and 51, C.I. Pigment Red I, 2, 3, 5, 17, 22, 23, 31, 38, 48:2, 48:2 (Permanent Red 2B (Ca)), 48:3, 48:4, 49:1, 52:2, 53:1, 57:1 (Brilliant Carmine 6B), 60:1, 63:1, 63:2, 64:1, 81, 83, 88, 101 (Rouge), 104, 105, 106, 108 (Cadmium Red), 112, 114, 122 (Quinacridone Magenta), 123, 146, 149, 166, 168, 170, 172, 177, 178, 179, 185, 190, 193, 209, 219 and 254, C.I. Pigment Violet I (Rhodamine Lake), 3, 5:1, 16, 19, 23 and 38, C.I. Pigment Blue I, 2, 15 (Phthalocyanine Blue), 15:1, 15:2, 15:3 (Phthalocyanine Blue), 16, 17:1, 56, 60 and 63; and C.I. Pigment Green I, 4, 7, 8, 10, 17, 18 and 36.

The method for dispersing the pigment in the ink or treatment liquid includes a dispersing method by using a surfactant, a dispersing method by using a dispersible resin, a dispersing method by covering the surface of the pigment with a resin, and a method by introducing a hydrophilic functional group to the surface of the pigment to provide a self-dispersible pigment.

The method for dispersing the pigment in the ink or treatment liquid can also be done by using the polyurethane resin of the invention as a dispersant. The advantage of this method, is that a better compatibility between the colour pigment and the resin is achieved in the ink, leading to an improved colloidal stability of the inkjet ink and improved physical properties of the cured image layer.

In particular, a self dispersible pigment is preferably used. The self-dispersible pigment having a hydrophilic functional group, may also contain an anionic functional group. Examples of the anionic functional group include —COOM, —$SO_3$M, —$PO_3$HM, —$PO_3M_2$, —$SO_3NM_2$, —NH, —$C_6H_4$—COOM, —NH—$C_6H_4SO_3$M, —NH—$C_6H_4PO_3$HM, —NH—$C_6H_4PO_3M_2$, —NH—$C_6H_4$CONHM and —NH—$C_6H_4$—$SO_2$NHM and examples of the counter ion M include an alkali metal ion and a quaternary ammonium ion, but a quaternary ammonium ion is preferable. Examples of suitable self dispersible pigments are self-dispersible pigments from Emerald and from Cabot: Cab-O-Jet 200 (K), Cab-O-Jet 250C, Cab-O-Jet 260M & 265 M, Cab-O-Jet 270 Y, are ionically stabilized, Cab-O-Jet 260 (M), Cab-O-Jet 450C, Cab-O-Jet 470Y, Cab-O-Jet 480V, Cab-O-Jet 400 (CB), Cab-O-Jet 465 M, most of them are modified by a sulfonate or carboxylate group.

The self dispersible pigment is preferably a modified pigment which can be modified by a carboxylate or sulfonate group. Other possible groups are a bis-phosphonic acid group or a bis-phosphonic acid salt group, or both thereof.

B.2. Water Soluble Organic Solvent

The inkjet ink of the invention may also contain as a solvent, a water-soluble organic solvent. Examples of water-soluble organic solvents include polyhydric alcohols such as diethylene glycol, triethylene glycol, dipropylene glycol, 1,3-propanediol, 1,3-butanediol, 1,4-butanediol, 2,2-dimethyl-1,3-propanediol, 2-methyl-1,3-propanediol, 1,2-pentanediol, 2,4-pentanediol, 1,5-pentanediol, 1,6-hexanediol, 2-ethyl-1,3-hexanediol, 1,2-hexanediol and 2,5-hexanediol, polyhydric alcohol alkyl ethers such as dipropylene glycol n-propyl ether, tripropylene glycol methyl ether, tripropylene glycol n-propyl ether, propylene glycol phenyl ether, triethylene glycol methyl ether, triethylene glycol methyl ether, triethylene glycol ethyl ether, diethylene glycol n-hexyl ether and ethylene glycol phenyl ether, and nitrogen-containing heterocyclic compounds such as 2-pyrrolidone and N-methylpyrrolidone.

Other preferred water soluble organic solvents include ethylene glycol, propylene glycol, 1,2-butanediol, 2,3-butanediol, 2-methyl-2,4-pentanediol, dipropylene glycol monomethyl ether, propylene glycol n-butyl ether, propylene glycol t-butyl ether, diethylene glycol methyl ether, ethylene glycol n-propyl ether and ethylene glycol n-butyl ether.

The content of the water-soluble organic solvent, in the aqueous ink jet ink is preferably 20% by mass or more and less than 70% by mass. If the content is less than 20% by mass, reliable jetting might be difficult, due to for instance a viscosity mismatch between ink and head. If the content exceeds 70% by mass, the ink looses its water based, more green character.

The water-soluble organic solvent is preferably a mixture of organic solvents comprising 3-methoxy-3-methyl-1-butanol. This organic solvent increases the viscosity of the ink leading to a possible ink formulation with less co-solvent. As 3-methoxy-3-methyl-1-butanol is volatile it also reduces the ink drying time.

B.3. Photoinitiator

The inkjet ink or treatment liquid comprising the radiation curable polyurethane resin of the invention can be cured by means of radiation such as e-beam radiation or UV-light radiation. Preferably, the curing of the jetted inkjet ink or treatment liquid is performed by means of UV-light. The inkjet ink therefore comprises then a photoinitiator.

Any conventional initiator of free radical photopolymerization can be used as photoinitiators such as disclosed in "UV & EB Curing Formulations for Printing Inks Coatings & Paints", edited by Dr. R. Holman & Dr. P. Oldring and published by SITA-Technology, 203 Gardiner House, Broomhill Road, London SW18 England.

Suitable examples of photoinitiator systems include, but are not limited to, aromatic carbonyl compounds such as benzoin, benzoin alkyl ethers, such as the isopropyl or n-butyl ether, a-substituted acetophenones, preferably benzil ketals, such as benzil dimethyl ketal (available commercially as IRGACURE® 651, Ciba Specialty Chemicals Inc., Hawthorne, N.Y.), or a-halogen-substituted acetophenones, such as trichloromethyl-p-tert-butylphenyl ketone or morpholinomethyl phenyl ketone (e.g. 2-methyl-1,4-(methylthio)phenyl-2-morpholino-propan-1-one (available commercially as IRGACURE®907) and 2-benzyl-2-dimethylamino-1-(4-morpholino-phenyl)-butan-1-one (available commercially as IRGACURE®369), or dialkoxyacetophenones, such as diethoxyacetophenone, or a-hydroxyacetophenones, such as a 50/50 mixture of 1-hydroxycyclohexyl phenyl ketone and benzophenone (available commercially as IRGACURE®500) or 1-hydroxycyclohexyl phenyl ketone (available commercially as IRGACURE®184); or 2-hydroxy-2-methyl-1-phenyl-1-propanone (available commercially as DAROCUR®1173, Ciba Specialty Chemicals Inc., Hawthorne, N.Y.); or benzophenones, such as benzophenone or bis(4-dimethylamino)benzophenone (Michler's Ketone) or methyl-o-benzoyl benzoate; or a quinone or a thioxanthone in conjunction with an amine which carries at least one hydrogen atom at an a-carbon atom, such as anthraquinone, benzoquinone or thioxanthone in conjunction with bis(4-dimethyl-amino) benzophenone or triethanolamine; or a thioxanthone, for example an alkyl- or halogen-substituted thioxanthone, such as 2-isopropylthioxanthone or 2-chloro-thioxanthone; or acyl phosphides. The preferred photoinitiators will depend on the UV curable resin used and will be readily apparent to those of ordinary skill in the art. The currently preferred photoinitiators for the preferred urethane resins are a-hydroxyaceto-phenones, such as a 50/50 mixture of 1-hydroxycyclohexyl phenyl ketone and benzophenone (IRGACURE®500, Irgacure/Darocur 2959), 1-hydroxycyclohexyl acetophenone (IRGACURE® 184), and 2-hydroxy-2-methyl-1-phenyl-1-propanone (DAROCUR® 1173).

In a particularly preferred embodiment of the aqueous radiation curable inkjet ink or treatment liquid, one or more polymerisable photoinitiators can be incorporated. These inkjet inks can be advantageously used in applications where so-called low migration inkjet inks are useful for minimizing health risks, such as food packaging, drink packaging, pharmaceutical packaging, cutlery, drinking vessels, dinner plates, placemats, toys, medical devices, shoes, textile and clothing.

The polymerisable photoinitiator is preferably a free radical photoinitiator, more specifically a Norrish type I initiator or a Norrish type II initiator. A free radical photoinitiator is a chemical compound that initiates polymerization of monomers when exposed to actinic radiation by the formation of a free radical. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or a co-initiator.

The polymerisable photoinitiators may include a photoinitiating group derived from photoinitiators are disclosed in CRIVELLO, J. V., et al. Photoinitiators for Free Radical Cationic and Anionic Photopolymerisation. 2nd edition. Edited by BRADLEY, G. London, UK: John Wiley and Sons Ltd, 1998. p. 287-294.

Preferred polymerisable photoinitiators contain one or more photoinitiating functional groups derived from a Norrish type II-initiator selected from the group consisting of benzophenones, thioxanthones, 1,2-diketones and anthraquinones.

Other suitable polymerisable photoinitiators are also those disclosed in EP 2065362 A (AGFA) in paragraphs [0081] to [0083] for polymerisable photoinitiators. Other preferred polymerisable photoinitiators are those disclosed in EP 2161264 A (AGFA).

In a photoinitiating system, one of the photoinitiators can also function as a sensitizer enhancing the reactivity of another photoinitiator. Preferred sensitizers are polymerisable sensitizers such as those disclosed in EP 2053095 A (FUJIFILM).

In a very preferred embodiment, the aqueous radiation curable inkjet ink or treatment liquid includes a polymerisable thioxanthone photoinitiator and an acylphosphine oxide-based polymerization photoinitiator, more preferably a bis(2,4,6-trimethylbenzoyl)-phenylphosphineoxide photoinitiator.

Photoinitiators like bis(2,4,6-trimethylbenzoyl)-phenylphosphineoxide photoinitiator are monofunctional but are allowed to migrate in fairly high amount by the Swiss ordinance SR 817.023.21 on Objects and Materials due to their very low toxicity level.

In order to increase the photosensitivity further, the aqueous radiation curable inkjet ink, may additionally contain co-initiators. Suitable examples of co-initiators can be categorized in three groups: 1) tertiary aliphatic amines such as methyldiethanolamine, dimethylethanolamine, triethanolamine, triethylamine and N-methylmorpholine; (2) aromatic amines such as amylparadimethylaminobenzoate, 2-n-butoxyethyl-4-(dimethylamino) benzoate, 2-(dimethylamino)ethylbenzoate, ethyl-4-(dimethylamino) benzoate, and 2-ethylhexyl-4-(dimethylamino)benzoate; and (3) (meth)acrylated amines such as dialkylamino alkyl (meth)acrylates (e.g., diethylaminoethylacrylate) or N-morpholinoalkyl-(meth)acrylates (e.g., N-morpholinoethylacrylate). The preferred co-initiators are aminobenzoates.

Suitable co-initiators include compounds such as triethanolamine, methyl diethanolamine. Further preferred co-initiators are selected from the group consisting of N-phenyl glycine derivatives and 4-dialkylamino-benzoic acid derivatives or salts thereof, N-phenyl glycine and 4-dimethylamino-benzoic acid being particularly preferred.

The co-initiator is preferably a polymerisable co-initiator, more preferably a polymerisable co-initiator including at least one (meth)acrylate group, more preferably at least one acrylate group.

Some co-initiators, like ethylhexyl-4-dimethylaminobenzoate, are not diffusion hindered co-initiators but are allowed by the Swiss ordinance SR 817.023.21 on Objects and Materials due to their very low toxicity level. In a preferred embodiment, the aqueous radiation curable inkjet ink includes ethylhexyl-4-dimethylaminobenzoate as co-initiator.

The aqueous radiation curable inkjet ink preferably includes a polymerisable amine co-initiator.

Preferred polymerisable co-initiators disclosed in EP 2053101 A (AGFA) in paragraphs [0088] to [0097]. Preferred commercially available co-initiators include Photomer™ 4967F and Photomer™ 5006F from IGM; CN3715 LM from ARKEMA; Genomer™ 5275 from RAHN; and Ebecryl™ PM6 from ALLNEX.

When a cationic photoinitiator can be used with the radiation curable PU-resin, any suitable cationic photoinitiator known to those skilled in the art can be used. Suitable cationic photoinitiators include, but are not limited to, onium salts selected from iodonium, sulfonium, phosphonium, arsonium, azonium, bromonium, or selenonium salts, and the like, and mixtures thereof. Particularly preferred cationic photoinitiators are the diaryl iodonium salts and their derivatives, the triaryl sulfonium salts and their derivatives, and the triphenyl phosphonium salts and their derivatives.

The amount of photoinitiator in the ink jet inks or treatment liquids of the invention can be expressed in terms of weight percent based on the total of the carrier medium components in the ink jet ink or treatment liquid. Broadly, the ink jet ink or treatment liquid will contain about 1 to about 8 wt. % of the photoinitiator, preferably about 2 to about 7 wt. %, and most preferably about 3 to about 6 wt. %.

B.4. Humectant

The ink jet ink or treatment liquid of the invention may contain at least one humectant to prevent the clogging of nozzles in an inkjet print head, due to its ability to slow down the evaporation rate of the inkjet ink, especially the water in the inkjet printing liquid. The humectant is an organic solvent having a higher boiling point than water.

Suitable humectants include triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. A preferred humectant is glycerol or a derivative or isomer of 2-pyrolidone.

The humectant is preferably added to the inkjet ink or treatment liquid in an amount of 0.1 to 20 wt % based on the total weight of the inkjet printing liquid.

B.5. Surfactant

In the ink or treatment liquid of the present invention, a surfactant may be added in order to ensure wettability onto the substrate. The amount of the surfactant added is preferably 0.1 wt. % to 5 wt. % as an active component in the ink.

If the amount added is below 0.1% by mass, wettability onto the substrate is not sufficient and causes degradation in image quality and might cause jetting issues. If the amount exceeds 5% by mass, the ink easily foams to cause non-discharge. The surfactant that can be used is not particularly limited as long as it satisfies the above limitation.

Any of an amphoteric surfactant, a non-ionic surfactant, an anionic or cationic surfactant can be used. Non-ionic surfactants: such as polyoxyethylene alkyl phenyl ether, polyoxyethylene alkyl ester, polyoxyethylene alkylamine, polyoxyethylene alkyl amide, a polyoxyethylene propylene block polymer, sorbitan fatty acid ester, polyoxyethylene sorbitan fatty acid ester and an ethylene oxide adduct of acetylene alcohol are preferably used in terms of a relationship between dispersing stability of the colour material and image quality. In addition, a fluorine-based surfactant and a silicon-based surfactant can be used in combination (or singly) depending on formulation.

Suitable surfactants are siloxane based surfactants such as Tego Twin 4000 from Evonik Industries, Tegowet 270 from Evonik industries, Hydropalat WE3220 from BASF, silane based surfactants such as Silwet HS312 from Momentive and fluor containing surfactants such as: Thetawet FS8150 from Neochem GMBH, Capstone FS3100 from Dupont, Tivida FL2500 from Merck and surfactants from the Dynol, Envirogem & Surfynol series from Air products.

C. Ink Jet Recording Method

The inkjet recording method of the present invention includes at least a step of curing the jetted inkjet ink and/or curing the treatment liquid comprising the radiation curable polyurethane of the invention. The inkjet recording method of the present invention may also include the heating of the substrate prior and optionally during the ink jetting step. The method further includes a heating/drying step and other steps appropriately selected, if necessary. During the drying and optional heating step, the jetted ink forms a layer.

The ink jet ink of the present invention is suitable for ink jet printing on different substrates, porous and non-porous ones. Porous substrates include paper, card board, white lined chipboard, corrugated board, packaging board, wood, ceramics, stone, leather and textile. Non-porous substrates include metal, synthetic leather, glass, polypropylene, polyvinylchloride, PET, PMMA, polycarbonate, polyamide, polystyrene or co-polymers thereof. The heating step of the substrate is particularly advantageously when non-porous substrates are used in the inkjet recording method of the invention.

In some instances, a treatment liquid may be applied to the substrate prior to jetting the inkjet ink onto the substrate to form an image. Treatment liquids are preferably applied on porous substrates such as textile fabrics or on non-porous substrates. In a preferred embodiment the treatment liquid may comprise the radiation curable polyurethane resin and the treatment liquid can optionally be cured by exposure to radiation prior to the jetting of the inkjet ink.

While the ink of the present invention can be used for printing a high-quality image, the substrate may be heated before and/or during jetting of the ink in order to form an image having a higher image quality (e.g. coalescence) and high scratch resistance and adhesiveness and in order to achieve high printing speeds.

The ink ejection step is a step of applying a stimulus to the ink constituting the present invention to thereby allow the ink to be ejected, forming an image. An ink ejection unit is a unit for applying a stimulus to the ink constituting the present invention to thereby allow the ink to be ejected, forming an image. The ink ejection unit is not particularly limited, and can be appropriately selected depending on the object. Examples thereof include various recording heads (ink discharge heads), and in particular, one having a head having a plurality of nozzle rows and a sub-tank for accommodating a liquid supplied from a tank for liquid storage to supply the liquid to the head is preferable.

The stimulus can be generated by a stimulus-generating unit, the stimulus is not particularly limited and can be appropriately selected depending on the object, and examples thereof include heat (temperature), pressure, vibration, and light. These may be used singly or in combinations of two or more. Among them, heat and pressure are suitable.

Herein, examples of the stimulus-generating unit include a heating apparatus, a pressurizing apparatus, a piezoelectric element, a vibration-generating apparatus, an ultrasonic wave oscillator, and a light. Specific examples include piezoelectric actuators such as a piezoelectric element, a thermal actuator utilizing a phase transition of liquid due to film boiling using an electro-thermal conversion element such as a heat resistor, a shape memory alloy actuator using a metal phase transition due to change in temperature, and a static actuator using an electrostatic force.

The mode of ejection of the ink is not particularly limited and is different depending on the type of the stimulus, and when the stimulus is "heat", examples of the mode include a method in which heat energy corresponding to a recording signal is applied to the ink in a recording head using a thermal head or the like to thereby allow the ink to generate air bubbles, and the pressure of the air bubbles allows the ink to be discharged and jetted as droplets from a nozzle hole of the recording head. In addition, when the stimulus is "pressure", examples of the mode include a method in which a voltage is applied to a piezoelectric element adhered to a position called pressure chamber located in an ink passage in a recording head, to deflect the piezoelectric element and to decrease the volume of the pressure chamber, discharging and jetting the ink as droplets from a nozzle hole of the recording head.

Among them, preferable is the method in which a voltage is applied to a piezo element to allow the ink for recording to be ejected. Since a piezo system does not generate heat, this is efficient for allowing a resin particle-containing ink to be ejected, and is an effective method that causes less nozzle clogging.

In the inkjet recording method of the present invention, it is preferable that heating and drying be further performed even after printing. Film formation of the jetted layer takes place during the drying step and the optional heating step.

In the inkjet recording method of the present invention, the ink which has been jetted onto a substrate is exposed to curing. Any suitable source of radiation may be used to initiate curing, such as, for example, UV lamps, LEDs (light emitting diodes), LEP (light emitting plasma) plasma torches, or lasers operating in the UV range. Electron beam curing may also be used. The actual wavelength (within the UV range of 280 nm to 400 nm) and intensity of the ultraviolet radiation used may vary, depending at least in part, upon the curable polyurethane binder included in the ink.

EXAMPLES

Methods
1. Storage Stability

Storage stability of the inks was evaluated numerically and visually. If the relative viscosity of the ink increases more than 20% after being stored for 2 weeks at 60° C. the ink is called unstable. If the ink solidifies or if phase separation can be seen the ink is called unstable. The viscosity of the inks was measured at 32° C. using a "Robotic Viscometer Type VISCObot" from CAMBRIDGE APPLIED SYSTEMS.

2. Inkjet Recording Method
Method 1

Inks were coated on a substrate with an automated bar coater using a 10 μm spiral bar head on various substrates. After drying the coated films at 60° C. in an oven, they were UV cured using a Fusion DRSE-120 conveyer, equipped with a Fusion VPS/1600 lamp (H-bulb) by passing the sample twice under the H-bulb lamp at a belt speed of 20 m/min and at full power of the lamp.

When testing a pre-treatment liquid, the pre-treatment liquid formulation was coated on a substrate in an identic way using the automated bar coater. Before applying the ink on top of the pre-treatment liquid, the pre-treatment liquid was dried at 60° C. in an oven. It was not cured before application of the coloured ink, unless mentioned otherwise.

Method 2

Ink formulations were filtered over a 0.7 μm Whatmann filter before being filled into an ink cartridge of a Dimatix DMP2831 inkjet printer. A printing test was then performed using a Dimatix DMP2831 inkjet printer with a cartridge temperature of 22° C. at a firing frequency of 5 kHz and a firing voltage of 20-22 V using a standard Dimatix 10 pl head without degassing, but with intermediate purging (2 s purge blot every 80 lines). Next the print was dried in an oven at 60° C. and UV cured using a Fusion DRSE-120 conveyer, equipped with a Fusion VPS/1600 lamp (H-bulb) by passing the sample twice under the H-bulb lamp at a belt speed of 20 m/min and at full power of the lamp.

3. Scratch Resistance

After following the Method 1 or 2, the dried & cured film could be further evaluated. In case of dry scratch resistance the film was scratched with a pen with a tungsten carbide tip and ink delamination of the scratch was evaluated according the criteria in Table 1. In case of wet scratch resistance the dried coating/print was soaked in water at room temperature. After 10 minutes the pieces are removed from the water and placed on an absorbent tissue just before scratching with a tungsten carbide tipped pen. Next the scratch is rubbed once with a nitrile substrate and the level of delamination was quantified according the criteria in Table 2.

TABLE 1

| Delamination by dry scratching | Score |
| --- | --- |
| No or very limited trace of scratching | 1 |
| Slight delamination of scratch/substrate slightly visible | 2 |
| Strong delamination of scratch/substrate clearly visible | 3 |

TABLE 2

| Delamination after wet scratching | Score |
| --- | --- |
| No or very limited trace of scratching | 1 |
| Slight delamination around scratch/substrate slightly visible | 2 |
| Strong delamination around scratch/substrate clearly visible | 3 |

4. Solvent Resistance

After following the Deposition Method 1 or 2, the dried & cured film could be further evaluated. The solvent resistance was tested by means of wiping the dried and cured film with a swab soaked in isopropanol. The level of solvent resistance was quantified according the criteria in Table 3.

TABLE 3

| Level of solvent attack | Score |
| --- | --- |
| No or very limited influence on film appearance | 1 |
| Slight influence on film appearance/substrate slightly visible | 2 |
| Strong influence on film appearance/substrate strongly visible | 3 |

Materials

All materials used in the following examples were readily available from standard sources such as Sigma-Aldrich (Belgium) and Acros (Belgium) unless otherwise specified. The water used was demineralised water.

Acetone is acetone p.a. supplied by VWR International

Vylon 220 is a polyester polyol containing terephthalic ester and isophthalic ester units obtained from Toyobo Dynacoll 7150 is a polyester polyol containing terephthalic ester and isophthalic ester units supplied by Evonik Ymer N120 is 1,3 diol polyether supplied by Perstorp DBTL is dibutyl tin laurate (KEVER-KAT DBTL 162) supplied by Brenntag DMPA is dimethylol propionic acid supplied by Geo Chemicals IPDI is a Vestanat IPDI, isocyanate supplied by Evonik BD is 1,4-butane diol supplied by Acros PI is a photoinitiator Irgacure 500 supplied by Ciba Specialty Chemicals Laromer LR8765R is a 1,4-butanediol diglycidyl ether diacrylate supplied by BASF Triethylamine is triethylamine supplied by Acros COL-1 is a commercial cyan dispersion supplied by Cabot Corporation, available under the trade name Cab-O-Jet 450C COL-2 is a commercial cyan dispersion supplied by DIAMOND DISPERSIONS LTD, available under the trade name Diamond D75C PYR is 2-pyrrolidone.

HD is 1,2-hexanediol

SURF-1 is Capstone FS3100, a surfactant from Dupont

SURF-2 is Tego Twin 4000, a surfactant from Evonik Industries

SURF-3 is Thetawet FS8050, a surfactant from Neochem GMBH

SUBSTR-1 is Barlo XT, a PMMA substrate from the Barlo Group

SUBSTR-2 is standard, mat, white polystyrene supplied by Iroplastics

SUBSTR-3 is Priplak Classic, a polypropylene substrate supplied by Antalis, UK

SUBSTR-4 is Barlo TL 30%, a polycarbonate substrate from the Barlo group

SUBSTR-5 is Metamark MD5-100 (PVC)

Preparation of Polyurethane Resin Dispersions

PU-1 (INV):

In an Erlenmeyer of 500 ml the following compounds were weighed: 111.27 g of Vylon 220; 16.33 g of Ymer N120, and 201.45 g of acetone. The Ymer N120 was preheated in an oven at 80° C., in order to obtain a liquid which can be easily handled. The mixture weighed in the Erlenmeyer was stirred using a magnetic stirrer and heated to 45° C. A clear solution is obtained and cooled to room temperature which will be later on used in the reaction. In a 500 ml 3-necked round bottom flask equipped with a coiled condenser and stirrer, 2.34 g of dimethylol propionic acid was added. The prepared polyol solution (Vylon 220+Ymer N120) is added to DMPA powder present in the 500 ml 3-necked round bottom flask. 1.07 g of DBTL was diluted in 9.67 g of acetone and also added to the polyol mixture. Then the reactor was heated to 55° C. during appr. 35 minutes, allowing the DMPA to dissolve. Subsequently the isocyanate is added dropwise via an addition funnel with pressure equalization arm during 20 minutes. For this experiment we have used 28.23 g of IPDI. The amount isocyanate added is an excess towards the hydroxyl amount, ie. NCO/OH=1.53). The reaction is allowed to take place during 2 hours at 54° C. The isocyanato terminated pre-polymer and free IPDI which is available in excess is then further reacted using an acrylate functional diol, ie. Laromer LR8765R as chain extender. The acrylate diol is added to compensate for the excess of isocyanate, ie. 15.24 g of Laromer LR8765R (NCO/OH=1). The reaction mixture is cooled to 44° C., in order to avoid evaporation of acetone. The reaction mixture is then allowed to react overnight during 20 hour at 44° C. s in order to reach full conversion. Then 1.76 g of trimethylamine is added to neutralize the carboxylic acid groups and the reaction mixture is heated until 52° C. during 30 minutes. When the temperature reaches 52° C., the mixture is cooled to room temperature. Subsequently the water based dispersion is made using Disperlux equipment adding water during high shear mixing. For the dispersion step, 385.43 g of the neutralized solution is put in a stainless steel vessel. Under stirring at 900 RPM using a 9 cm diameter dissolver stirrer, 302.56 g of water is added during 20 minutes. The acetone in the obtained dispersion is evaporated on a rotary evaporator. In order to avoid foaming the evaporation is started at a lower vacuum. The evaporation is stopped when also water is evaporated at a pressure of 60 mbars and a 40° C. heating bath. Based on the weight the concentration is corrected by adding water to 35%. The exact solid content is determined by drying 1 g of solution on an aluminum dish at 130° C. during 120 minutes. The solid content obtained was 36.19 wt. %. The measured pH was 7.37. Particle size measurement using Zetasizer gave 253 nm.

PU-2 (INV):

In an Erlenmeyer of 500 ml the following compounds were weighed: 111.27 g of Vylon 220, 16.33 g of Ymer N120 (supplied by Perstorp), and 201.45 g of acetone. The Ymer N120 was preheated in an oven at 80° C., in order to obtain a liquid which can be easily handled. The mixture weighed in the Erlenmeyer was stirred using a magnetic stirrer and heated to 45° C. A clear solution is obtained and cooled to room temperature which will be later on used in the reaction. In a 500 ml 3 necked round bottom flask equipped with a coiled condenser and stirrer, 2.34 g of dimethylol propionic acid was added. The prepared polyol solution (Vylon 220+Ymer N120) is added to DMPA powder present in the 500 ml 3-necked round bottom flask. 1.07 g of DBTL was diluted in 9.67 g of acetone and also added to the polyol mixture. Then the reactor was heated to 55° C. during appr. 35 minutes, allowing the DMPA to dissolve. Subsequently the isocyanate is added dropwise via an addition funnel with pressure equalization arm during 20 minutes. For this experiment we have used 28.23 g of IPDI. The amount isocyanate added is an excess towards the hydroxyl amount, ie. NCO/OH=1.53). The reaction is allowed to take place during 2 hours at 54° C. The isocyanato terminated pre-polymer and free IPDI which is available in excess is then further reacted using hydroxybutyl acrylate producing an acrylate terminated polyurethane. The hydroxybutyl acrylate can be regarded then as a chain stopper due to the one hydroxyl functional group. The hydroxybutyl acrylate is added to compensate for the excess of isocyanate, ie. 12.69 g of 4-hydroxybutyl acrylate (NCO/OH=1). The reaction mixture is cooled to 40° C., in order to avoid evaporation of acetone. The reaction mixture is then allowed to react overnight during 20 hour at 40° C. s in order to reach full conversion. Then 1.76 g of trimethylamine is added to neutralize the carboxylic acid groups and the reaction mixture is heated until 52° C. during 30 minutes. When the temperature reaches 52° C., the mixture is cooled to room temperature. Subsequently the water based dispersion is made using Disperlux equipment adding water during high shear mixing. For the dispersion step 354.64 g of the neutralized solution is put in a stainless steel vessel. Under stirring at 900 RPM using a 9 cm diameter dissolver stirrer 296.97 g of water is added during 20 minutes. The acetone in the obtained dispersion is evaporated on a rotary evaporator. In order to avoid foaming the evaporation is started at a lower vacuum. The evaporation is stopped when also water is evaporated at a pressure of 60 mbars and a 40° C. heating bath. Based on the weight the concentration is corrected by adding water to 35%. The exact solid content is determined by drying 1 gram of solution on an aluminum dish at 130° C. during 120 minutes. The solid content obtained was 35.41 wt. %. The measured pH was 7.62. Particle size measurement using Zetasizer gave 1276 nm.

PU-3 (COMP):

In a 12 litre jacketed reactor equipped with a coiled condenser was added 50.5 g of dimethylol propionic acid (DMPA), 358.9 g of Ymer N120 which is preheated at 40° C., 23.2 g of DBTL, and 4564 g of acetone. The reactor is stirred at 200 RPM and 2444.7 g of Dynacol 7150 is assed. The reactor is heated to 55° C. until all compounds are dissolved, ie. appr. 45 minutes. During 30 minutes 558.8 g of IPDI (vestanat IPDI) is added. The reaction mixture is reacted for 2 hours at 55° C. and the reactor is cooled to 45° C., Subsequently 80.0 g of BD is added during 10 minutes. The reaction mixture is then further reacted during appr. 20 hours (overnight) at 45° C. The 38.1 g of Triethylamine is added and stirred for 30 minutes. The polymer solution is cooled to 20° C. The theoretical amount of reaction mixture was 8112 g, but only 7356 g was obtained due to evaporation of acetone overnight. The 762 g of acetone which was evaporated was added again to the reaction mixture. The concentration is determined by taken 1 gram and drying 120 minutes at 70° C. The concentration determined was 43.82 wt. %.

For making the dispersion the acetone solution was divided in two parts to be dispersed in two batches, which can be combined again afterwards. The dispersion is made in a stainless steel vessel of 10 litres having a diameter of 22.5 cm. and using Disperlux equipment equipped with a 12.5 cm diameter dissolver stirrer. In the vessel 3980 g of PU solution in acetone is added. The solution is slowly stirred at 930 RPM. Afterwards 3114.64 g of water is added during 20 minutes. The dissolver stirrer is stirred up to 1865 RPM during 10 minutes. After approx. 30 wt. % of the water is added the rotation speed of the stirrer is reduced to 930 RPM. After all water is added in total 30 minutes, the mixture during is stirred for still 5 minutes. This dispersion preparation on a scale of 4 kg of acetone is repeated. Both acetone/water mixtures were combined (ie. 12635 g) and added to a 12 litre jacketed Radleys reactor heated at a jacket temperature of 40° C. and stirred at 200 RPM. The acetone present in the dispersion is distilled off going to a pressure of 55 mBar at a temperature of 35° C. After cooling to room temperature the solids content is determined by taken 1 g and drying at 130° C. during 90 minutes. The solids content obtained is 50.5 wt. %.

PU-4 (INV)

The polyester polyol Vylon 220 is pre-dissolved in an Erlenmeyer flask of 500 ml, ie. 104.94 g of Vylon 220 and 201.45 g of acetone. The polyester polyol is solubilized at 45° C. Ymer N120 is preheated in an oven at 80° C., in order to have a lower viscosity. The liquid Ymer N120 is added to the Vylon solution after a clear solution was obtained. We added 15.4 g of Ymer to the Vylon solution at 45° C. When all Ymer has dissolved the mixture is cooled to room temperature. The polymerization is performed in a 3-necked round bottom flask of 500 ml. 4.35 g of methyl diethanol amine is added to the round bottom flask and the solution of the other polyols prepared in the Erlenmeyer is added. 1.07 g of DBTL is added in 9.67 g of acetone. The reaction mixture is heated to 55° C. After the reaction mixture reached 55° C., 33.46 g of Desmodur I (IPDI) is added dropwise via an addition funnel with pressure equalization arm during 45 minutes. The IPDI added is in excess towards the hydroxyl groups present (NCO/OH=1.53). The reaction is then continued for another 120 minutes. In a second step the formed pre-polymer and excess of isocyanate is reacted by addition of the acrylate functional diol. We added 19.48 g of Laromer LR 8765R diluted with 5 g of acetone. The reaction mixture is then reacted overnight (ie. during appr. 20 hours) at 45° C. The reaction temperature overnight was lowered to 45° C. in order to avoid too much evaporation of acetone. The following day the reaction mixture is acidified using 2.19 g acetic acid and stirred still using 30 minutes at 55° C. The reaction mixture is cooled to room temperature. As solids content of 45.52 (wt.)% is obtained.

The dispersion is made in a stainless steel vessel of 1 litre having a diameter of 11 cm, and using disperlux equipment equipped with a 9 cm diameter dissolver stirrer. In the vessel 373.64 g of PU solution in acetone (45.52% solids) is added. The solution is slowly stirred at 900 RPM. Afterwards 315.87 g of water is added during 30 minutes. After addition of the water the, the mixture during is stirred for still 30 minutes. The dispersion (589.3 g) is added to a 1-neck round bottom flask for evaporation at a rotary evaporator under reduced pressure at 40° C. and 400 mbar pressure. After evaporation 391.7 g of dispersion is obtained and 94.2 g of demi-water is added in order to get a concentration of theoretical 35%. The concentration is measured by taken 1 g and drying 120 minutes at 70° C. The concentration determined was 34.53%. pH=6.0. Particle size Zetasizer=54 nm. Mean particle size measured by AF4 field flow fractionation gives a value of 87 nm.

Example 1

This example illustrates the advantage of using a UV curable polyurethane resin in an aqueous pigment based inkjet ink to broaden the latitude towards different substrate types.

Preparation of Cyan Inkjet inks

Two cyan inkjet inks, C-1 and C-2 were prepared by mixing the compounds given in Table 4. Formulation C-1 does contain a PU resin dispersion that has no acrylate groups (PU-3) and thus is not UV curable. Formulation C-2 does contain a PU resin dispersion with acrylate groups (PU-1), making it UV curable.

All weight percentages are relative to the total weight of the inkjet ink.

TABLE 4

| Compound | C-1 (COMP) Content in wt. % | C-2 (INV) Content in wt. % |
|---|---|---|
| PU-3 | 23.76 | 0 |
| PU-1 | 0 | 22.11 |
| PI | 0 | 0.5 |
| SURF-1 | 0.6 | 0.6 |
| SURF-2 | 0.2 | 0.2 |
| PYR | 20 | 20 |

TABLE 4-continued

| Compound | C-1 (COMP) Content in wt. % | C-2 (INV) Content in wt. % |
|---|---|---|
| HD | 20 | 20 |
| COL-1 | 20 | 20 |
| Water | To complete to 100% | To complete to 100% |

Evaluation and Results

Inks comprising a non-curable PU-resin were compared to inks comprising a UV curable PU resin. Both inks are stable and show excellent jetting behavior (no failing nozzles). After they were deposited according to Method 2, the jetted and cured layers were evaluated for dry scratch resistance as well as solvent resistance. From Table 5 it can be seen that, when comparing the same substrate, Cyan inkjet ink C-2 results in better dry scratch and solvent resistance than C-1.

TABLE 5

| | Dry scratch resistance | | Solvent resistance | |
|---|---|---|---|---|
| | C-1 | C-2 | C-1 | C-2 |
| SUBSTR-1 | 3 | 2 | 3 | 1 |
| SUBSTR-2 | 2 | 1 | 3 | 2 |

Example 2

This example illustrates that using a pre-treatment liquid comprising a cationic curable PU-resin according to the invention, applied on a non-porous substrate, to improve image quality of the jetted and cured image, does not decrease the physical properties of the dried and cured ink as the use of pre-treatment liquids comprising cationic polymers usually do.

Preparation of Cyan Inkjet Inks and Pre-Treatment Liquid

One cyan inkjet ink as well as one pre-treatment liquid were prepared mixing the compounds given in Table 6. C-3 is the pre-treatment liquid comprising an UV curable polyurethane with cationic groups (PU-4), while C-4 is a cyan inkjet ink comprising the UV curable polyurethane PU-1. All weight percentages are relative to the total weight of the inkjet ink.

TABLE 6

| Compound | C-3 Content in wt. % | C-4 Content in wt. % |
|---|---|---|
| PU-4 | 86.88 | 0 |
| PU-1 | 0 | 33.16 |
| PI | 1 | 0.5 |
| SURF-1 | 1 | 0.6 |
| SURF-2 | 0 | 0.2 |
| PYR | 0 | 20 |
| HD | 0 | 20 |
| COL-1 | 0 | 20 |
| Water | To complete to 100% | To complete to 100% |

Evaluation and Results

The cyan ink as well as the combination pre-treatment liquid and ink were deposited using Method 1. It was observed that the pre-treatment liquid and the ink are both stable. Next they were evaluated for both dry and wet scratch resistance as well as solvent resistance. From Table 7 it can be seen that, when comparing the same substrate, the presence of the pre-treatment liquid does not have a negative impact on the physical properties of the printed images.

TABLE 7

| | Dry scratch resistance | | Wet scratch resistance | | Solvent resistance | |
|---|---|---|---|---|---|---|
| | C-4 | C3 + C4 | C4 | C3 + C4 | C4 | C3 + C4 |
| SUBSTR-3 | 1 | 1 | 1 | 1 | 2 | 2 |
| SUBSTR-4 | 1 | 1 | 1 | 1 | 1 | 1 |

The pre-treatment liquid C-3 was further deposited using Method 1 onto SUBSTR-5 to obtain a pre-treated SUBSTR-5. Hereafter, cyan ink C-4 was deposited on untreated SUBSTR-5 and on pre-treated SUBSTR-5 using Method 2 to evaluate the image quality of the printed image. As a measure for the image quality, ink coalescence in the solid areas of the images jetted with the cyan ink C-4 was visually evaluated. Coalescence should be minimal. The results of the measurements of physical properties and image quality of the images obtained with C-4 ink are shown in Table 8.

TABLE 8

| Substrate | Dry scratch resistance | Wet scratch resistance | Solvent resistance | Coalescence |
|---|---|---|---|---|
| SUBSTR-5 | 1 | 1 | 1 | Strong |
| SUBSTR-5 pre-treated with C-3 | 1 | 1 | 1 | No |

This example illustrates that using a pre-treatment liquid comprising a cationic curable PU-resin according to the invention, applied on a non-porous substrate improves the image quality of the image obtained by jetting and curing a colour ink, but does not decrease the physical properties of the dried and cured ink.

Example 3

This example illustrates that the storage stability of the inkjet inks can be improved when the acrylate with at least two hydroxyl functional groups is built in the main chain of the polyurethane resin with respect to an acrylate terminated polyurethane obtained by using an acrylate with one hydroxyl functional group.

Preparation of Cyan Inkjet Inks 4 cyan inkjet inks were prepared mixing the compounds given in Table 9. Inks were prepared with both a dispersion based on a self-dispersible pigment from Cabot, and a non-self-dispersable pigment from Diamond Dispersions. PU-2 is a polyurethane dispersion of an acrylate terminated polyurethane. All weight percentages are relative to the total weight of the inkjet ink.

TABLE 9

| Compound | C-5 Content in wt. % | C-6 Content in wt. % | C-7 Content in wt. % | C-8 Content in wt. % |
|---|---|---|---|---|
| PU-1 | 22.11 | 0 | 22.11 | 0 |
| PU-2 | 0 | 22.59 | 0 | 22.59 |
| PI | 0.2 | 0.2 | 0.2 | 0.2 |
| SURF-3 | 0.5 | 0.5 | 0 | 0 |
| PYR | 10 | 10 | 10 | 10 |
| HD | 10 | 10 | 10 | 10 |
| COL-1 | 20 | 20 | 0 | 0 |

TABLE 9-continued

| Compound | C-5 Content in wt. % | C-6 Content in wt. % | C-7 Content in wt. % | C-8 Content in wt. % |
|---|---|---|---|---|
| COL-2 | 0 | 0 | 20 | 20 |
| Water | To complete to 100% | To complete to 100% | To complete to 100% | To complete to 100% |

Evaluation and Results

Cyan inks C-5, C-6, C-7 and C-8 were evaluated for storage stability, according to the method described. Table 10 clearly shows that the inks comprising PU-1 are stable with both types of pigments, as opposed to PU-2, clearly results in a lower formulation latitude.

TABLE 10

| Ink | Storage stability |
|---|---|
| C-5 | OK |
| C-6 | NOK |
| C-7 | OK |
| C-8 | NOK |

The invention claimed is:

1. A radiation curable polyurethane resin comprising:
an ionic group; and
a polyalkylene oxide in a side chain thereof; wherein
the radiation curable polyurethane resin is obtainable by reacting a polyester polyol, a polyether diol, a polyol including an ionic group or a tertiary amino group, a polyisocyanate, and a (meth)acrylate including a hydroxyl functional group or a (meth)acrylamide including a hydroxyl functional group; and
the polyester polyol is obtained by reacting an aromatic polycarboxylic acid and a polyol.

2. The radiation curable polyurethane resin according to claim 1, wherein the aromatic polycarboxylic acid is selected from the group consisting of phthalic acid, terephthalic acid, and isophthalic acid.

3. The radiation curable polyurethane resin according to claim 1, wherein the polyether diol is a compound according to Formula 1:

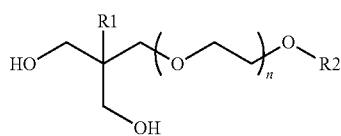

Formula 1 wherein
R1 is methyl or ethyl;
R2 is H or $C_1$-$C_4$ alkyl; and
n represents an integer from 5 to 50.

4. The radiation curable polyurethane resin according to claim 2, wherein the polyether diol is a compound according to Formula 1:

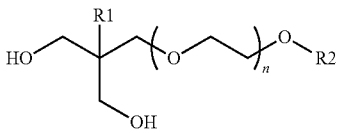

Formula 1 wherein
R1 is methyl or ethyl;
R2 is H or $C_1$-$C_4$ alkyl; and
n represents an integer from 5 to 50.

5. The radiation curable polyurethane resin according to claim 1, wherein the (meth)acrylate is an acrylate including at least two hydroxyl functional groups.

6. The radiation curable polyurethane resin according to claim 2, wherein the (meth)acrylate is an acrylate including at least two hydroxyl functional groups.

7. The radiation curable polyurethane resin according to claim 1, wherein the ionic group of the polyol is an anionic group.

8. The radiation curable polyurethane resin according to claim 2, wherein the ionic group of the polyol is an anionic group.

9. The radiation curable polyurethane resin according to claim 1, wherein the ionic group of the polyol is a cationic group.

10. The radiation curable polyurethane resin according to claim 2, wherein the ionic group of the polyol is a cationic group.

11. An aqueous radiation curable ink jet ink comprising:
a water soluble organic solvent; and
the radiation curable polyurethane resin according to claim 1.

12. An aqueous radiation curable ink jet ink comprising:
a water soluble organic solvent; and
the radiation curable polyurethane resin according to claim 2.

13. An aqueous radiation curable ink jet ink comprising:
a water soluble organic solvent; and
the radiation curable polyurethane resin according to claim 3.

14. The aqueous radiation curable ink jet ink according to claim 11, further comprising a pigment.

15. The aqueous radiation curable ink jet ink according to claim 12, further comprising a pigment.

16. The aqueous radiation curable ink jet ink according to claim 11, further comprising a photoinitiator.

17. The aqueous radiation curable ink jet ink according to claim 12, further comprising a photoinitiator.

18. An aqueous treatment liquid for inkjet printing comprising:
the radiation curable polyurethane resin according to claim 1.

19. An inkjet recording method comprising:
providing a substrate;
jetting onto the substrate an aqueous radiation curable ink jet ink according to claim 11; and
curing the aqueous radiation curable ink jet ink jetted onto the substrate with radiation.

* * * * *